3,043,412
Patented July 10, 1962

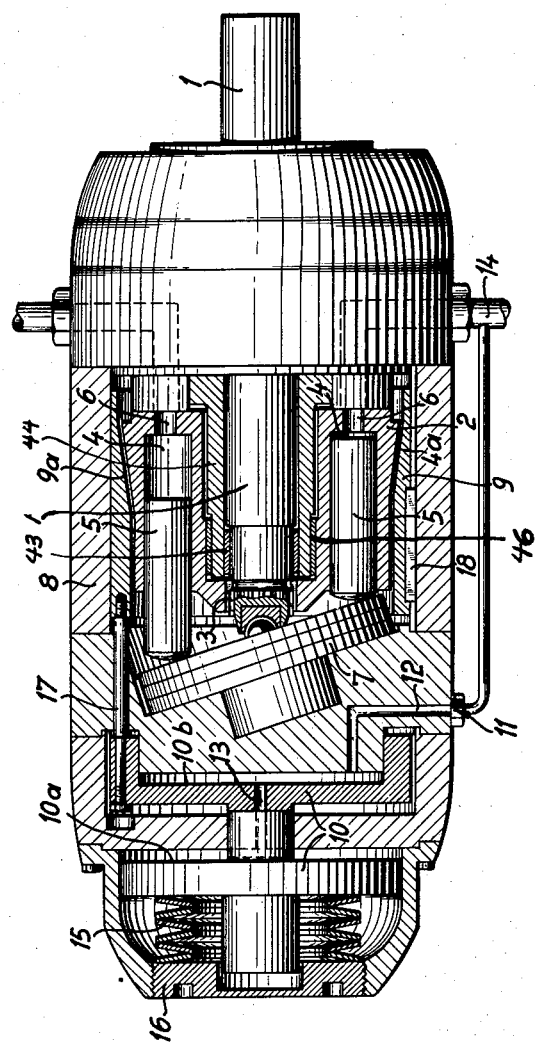

3,043,412
HYDRAULIC MOTOR WITH FRICTION BRAKE
Werner Bartholomäus, Berlin-Dahlem, Erwin Hessler, Berlin-Borsigwalde, and Rudolf Naumann, Dortmund-Wambel, Germany, assignors to Kamper-Motoren G.m.b.H., Berlin-Marienfelde, Germany, a German firm
Filed July 30, 1959, Ser. No. 830,493
Claims priority, application Germany Aug. 1, 1958
9 Claims. (Cl. 192—3)

This invention relates to fluid motors, such as hydraulically operated motors, and particularly to a combination of such a motor with brake means operated by the same hydraulic fluid that drives the motor.

It is known that hydraulically operated motors are provided with brakes for stopping action or for preventing the motors from coasting in the opposite direction of their operating direction of rotation when they are switched off. These brakes are usually friction brakes which consist conventionally of a separate unit, independently arranged of the motor, operated by special control valves and having special control pipe lines.

This invention is directed to a simplification and to an improvement of the aforementioned arrangements. The invention consists in such novel features, arrangements and combinations as may be shown and described in connection with the apparatus herein disclosed by way of example only and as illustrative of a preferred embodiment.

Therefore this invention has as one of its objects to provide means for combining an hydraulically driven motor and an hydraulically operated friction brake for said motor in a single housing.

It is another object of this invention to provide means for automatically hydraulically releasing the brake of a motor simultaneously with the starting of the motor.

A further object of the invention is to provide means for arranging the brake means for a motor at the point of the minimum torque of the motor.

Yet another object of the invention is to provide means for affording a substantial increase of the brake lifting force of a brake means resulting in greater braking power.

Furthermore, it is an object of this invention to provide means conducive to a very compact and strong structure of an hydraulically operated motor.

Still a further object of the invention is to provide means affording a considerable reduction of the number of operable parts and a simplification of the mechanism.

Other objects and advantages will be set forth in part herein and in part will be obvious herefrom or may be learned by practicing the invention, the same being realized and attained by means of the instrumentalities and combinations pointed out in the appended claims.

In the accompanying drawing which forms part of this specification one embodiment of the device pursuant to the invention is illustrated merely by way of example.

In the following description and in the claims, parts will be identified by specific names for convenience, but such names are intended to be as generic in their application to similar parts as the art will permit. Like reference characters denote like parts in the drawing which shows a cross-section of the hydraulically operated motor with the built-in brake.

Referring now in more detail to the drawing, there is shown a motor housing 8 in which a shaft 1 is rotatably mounted in a bearing 43. The bearing is held in a bracket 44 forming part of the housing 8. The piston drum 2 of the motor is arranged concentrically about the bracket 44 and is rotatably supported by a bearing 46 on the bracket 44.

The piston drum 2 is keyed to the shaft 1 by means of a face spline 3. In the piston drum 2 there are a plurality of cylinders 4, parallel to the shaft 1 and evenly spaced circumferentially within the piston drum 2. Pistons 5 are arranged to move in axial direction in the cylinders 4 under the pressure of a hydraulic fluid which is fed to the cylinders 4 through bores 6. After having attained their full forward stroke, the pistons 5 displace the hydraulic fluid into the discharge line (not shown in the drawing) on their back stroke by means of valves (not shown in the drawing).

The pistons abut against a circular plate 7 which is concentric with the center line of the shaft 1 but which is inclined at an angle against this center line. The circular plate 7 is non-rotatably firmly secured in the housing 8. Obviously the pistons 5 can only be moved in their cylinders 4 if they rotate the piston drum 2 so that they ride up and down on the inclined circular plate 7. In this way a torque is generated which is transmitted by the shaft 1.

The piston drum 2 has on its outside a cone 4a forming an external tapered surface and the stationary brake bushing 9, axially movable in the housing 8, has the corresponding brake cone 9a forming an internal tapered surface on its inside. A feather key 18 on the brake bushing 9 prevents the same from rotating.

In the housing 8 and concentric with the shaft 1 is a brake control piston 10 having two piston faces 10a and 10b. The hydraulic control fluid branched off the main fluid supply line 14 is directed through a line 11 and through passages 13 and 12 to the piston faces 10a and 10b, respectively, to act upon these faces. Abutting against the opposite end of the brake control piston is a spring 15 which also is located in the housing 8. A bottom plug screw 16 against which the spring 15 abuts is arranged for increasing or decreasing the spring pressure. The brake control piston 10 is connected by a plurality of bolts 17 with the brake bushing 9.

The operation is as follows:
When the motor is standing still, the powerful spring 15 presses the brake control piston 10 and by means of the bolts 17 the cone 9a of the stationary brake bushing against the brake cone 4a of the piston drum 2. Since the braking means are arranged directly on the parts which generate the torque and on the outside diameter thereof, the braking effect takes place on the point of the minimum torque of the motor, thus having the highest efficiency.

When hydraulic fluid is admitted under pressure for setting the motor in motion, a part of the same hydraulic fluid is admitted at the same time to the piston faces 10a and 10b of the brake control piston 10, moving the piston against the spring 15 and separating the two cones 4a and 9a thus releasing the brake. When the supply of the hydraulic fluid is shut off, the pressure against the piston faces 10a and 10b ceases and the spring 15 again presses the brake cones together.

Thus it can be seen that there has been provided an hydraulically operated motor comprising a housing 8, a shaft 1 rotatably disposed in the housing 8, a piston drum 2 in the housing and having cylinders 4 provided with pistons 5, a circular plate 7 extending at an acute angle to the center line of the housing 8, the piston drum 2 having an external tapered surface while brake bushing 9 has an internal tapered surface 9a complementary to the piston drum 2, an axially movable brake control piston 10 in the housing connected to the bushing 9 by bolts or tie rods 17, a coil spring 15 yieldably urging the piston 10 to move toward the internal tapered surface of the bushing 9a against the piston drum 2 to apply the brake while the housing is provided with passages 12 for applying an hydraulic fluid against the piston 10 to release the brake.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

Having thus described the invention, what is claimed as new and desired to be secured by Letters Patent is:

1. In an hydraulically operated motor having a housing provided with an axially movable brake control piston therein, spring means in said housing abutting against said brake control piston, passages in said housing for admitting hydraulic fluid to said brake control piston, the combination of a rotatable piston drum having external cone shaped brake means thereon with a non-rotatable axially displaceable brake bushing having corresponding internal cone shaped brake means cooperating with said external cone shaped brake means, said axially displaceable brake bushing being connected with said axially movable brake control piston.

2. An hydraulically operated motor comprising a housing, a shaft rotatably located in said housing, a piston drum having hydraulically operated axially displaceable pistons, said piston drum being fixedly attached to said shaft, a circular plate in said housing arranged at an angle with the center line of said housing, external cone shaped brake means on said piston drum, an axially displaceable brake bushing in said housing concentric with said piston drum having corresponding internal cone shaped brake means, said brake bushing being non-rotatably located in said housing, axially movable brake control piston means in said housing, said brake control means being fixedly connected with said brake bushing, spring means located in said housing abutting against said brake control piston means, said housing having passages therein for admitting hydraulic fluid means to said brake control piston means for separating the cone shaped brake means against the pressure of said spring means thus releasing the brake of said motor.

3. An hydraulically operated motor according to claim 2, said brake control piston means having a plurality of operating faces.

4. An hydraulically operated motor comprising a housing, a shaft rotatably disposed in said housing, a piston drum in said housing and attached to said shaft, said drum having cylinders therein, a circular plate fixedly secured in said housing concentric with said shaft and arranged at an acute angle to the center line of said housing, said piston drum having an external tapered surface, a brake bushing non-rotatable axially movably disposed in said housing surrounding said piston drum, said bushing having an internal tapered surface complementary to said external tapered surface, a plurality of pistons movably disposed in said cylinders and engaging said circular plate, an axially movable brake control piston in said housing secured to said bushing, a coil spring in said housing abutting against said brake control piston urging said internal tapered surface toward said external tapered surface, said housing having passages therein for admitting hydraulic fluid to said brake control piston to move said piston against the pressure of said spring to urge said internal tapered surface away from said external tapered surface.

5. An hydraulically operated motor comprising a housing, a shaft rotatably disposed in said housing, a piston drum in said housing and attached to said shaft, said drum having cylinders therein, a circular plate fixedly secured in said housing concentric with said shaft and arranged at an acute angle to the center line of said housing, said piston drum having an external tapered surface, a brake bushing non-rotatably axially movably disposed in said housing surrounding said piston drum, said bushing having an internal tapered surface complementary to said external tapered surface, a plurality of pistons movably disposed in said cylinders and engaging said circular plate, an axially movable brake control piston in said housing secured to said bushing, a coil spring in said housing abutting against said brake control piston urging said internal tapered surface toward said external tapered surface, said housing having passages therein for admitting hydraulic fluid to said brake control piston to move said piston against the pressure of said spring to urge said internal tapered surface away from said external tapered surface, said housing being provided with bores connected to said cylinders, said plurality of pistons pumping hydraulic fluid through said bores.

6. A hydraulic motor comprising a housing, a rotor in said housing including means movable by fluid pressure to effect rotation of said rotor, a brake member slidable in said housing and including a portion engageable with said rotor to stop rotation thereof, a motor piston slidable in said housing and connected to said brake member, and means for directing fluid pressure to said rotor and to at least one side of said motor piston to control the position of said brake in response to the fluid pressure delivered to said rotor.

7. A hydraulic motor according to claim 6, wherein said rotor includes a plurality of cylindrical portions, a rotor piston reciprocable within each of said cylindrical portions, and means for directing said fluid pressure to each of said cylinders to reciprocate said rotor piston.

8. A hydraulic motor according to claim 6, including means to bias said motor piston to urge said brake member into engagement with said rotor.

9. A hydraulic motor according to claim 6, wherein said brake member is an annular member surrounding said rotor.

References Cited in the file of this patent
UNITED STATES PATENTS

| | | |
|---|---|---|
| 712,833 | Moore | Nov. 4, 1902 |
| 2,246,923 | Meunier | June 24, 1941 |
| 2,258,307 | Vickers | Oct. 7, 1941 |
| 2,927,669 | Walerowski | Mar. 8, 1960 |